Patented Feb. 14, 1950

2,497,291

UNITED STATES PATENT OFFICE 2,497,291

COPOLYMERS OF ETHYLENE WITH VINYL CHLORIDE

Merlin M. Brubaker, Boothwyn, Pa., John R. Roland, Wilmington, Del., and Merlin D. Peterson, Oak Ridge, Tenn., assignors to E. I. du Pont de Nemours & Company, Wilmington, Del., a corporation of Delaware No Drawing. Application March 13, 1947, Serial No. 734,560

2 Claims. (Cl. 260—87.5)

This invention relates to improved ethylene/vinyl chloride polymers, and in particular to novel ethylene/vinyl chloride polymers containing specific amounts of combined vinyl chloride. This application is a continuation-in-part of our copending application S. N. 504,760, filed October 2, 1943, now U. S. Patent 2,422,392.

The solid polymers of ethylene are now well known; they are relatively high-melting, waxlike bodies which, in general, are permanently deformed when subjected to stretching or other forms of mechanical stress, and are characterized by being insoluble at normal temperatures (20° to 25° C.) in organic solvents, e. g. xylene, toluene, isooctane, and the like. Polymerized vinyl chloride is characterized by its solubility at normal temperatures in ketones and by its stiffness. It can be made pliable, however, by blending it with proper plasticizers. Polymers of ethylene with vinyl chloride have hitherto been described. Thus, in U. S. 2,342,400 such a polymer is characterized as a white powder. In U. S. 2,396,677 an ethylene/vinyl chloride polymer containing 30.3% chlorine, which corresponds to about a 53% combined vinyl chloride content, is described as tough and as having a very low solubility in the common organic solvents. U. S. 2,372,001 discloses an ethylene/vinyl chloride polymer containing 32.25% chlorine, which corresponds to about a 57% combined vinyl chloride content, but the properties of this polymer are not given. None of these hitherto disclosed ethylene/vinyl chloride polymers possesses the combination of solubility in aromatic hydrocarbon solvents at normal temperatures with flexibility and toughness desired in resins to be employed in coating systems and for unsupported films.

It is an object of this invention to provide new ethylene/vinyl chloride polymers which are soluble in aromatic hydrocarbon solvents such as xylene to the extent of at least 20% by weight at 25° C., and which are tough, inert, flexible and have excellent adherence to metallic surfaces. Another object is to provide coating compositions containing said polymers.

The above and other objects appearing hereinafter are accomplished by providing ethylene/vinyl chloride polymers having from 74 to 90% combined vinyl chloride by weight and especially ethylene/vinyl chloride polymers having 85 to 90% combined vinyl chloride by weight, and coating compositions containing the said ethylene/vinyl chloride polymers.

In one method for obtaining the ethylene/vinyl chloride polymers, ethylene is polymerized with vinyl chloride in an aqueous medium with a peroxy compound, under alkaline conditions in the presence of buffer salts which control the pH of the reaction medium within about 3.0 pH units during the polymerization reaction.

In another method the polymerization of ethylene with vinyl chloride is carried out in an aqueous medium with a peroxy compound, under alkaline conditions in the presence of buffer salts, which control the pH of the reaction medium within 3 pH units throughout the reaction and an oxidizable sulfoxy compound to be hereinafter described.

As the alkaline buffer, any water-soluble compound which gives a pH above 7 and preferably in the range from 8 to 11 may be used. Such compounds are borax, sodium carbonate, sodium acetate, disodium phosphate, sodium citrate, sodium benzoate, sodium tartrate, and the like. In place of the alkaline buffer salt we may use small amounts of triethanolamine or other similar buffering substances.

By an "oxidizable sulfoxy compound" is meant sulfur dioxide and compounds containing a sulfur-oxygen bond and which are capable of yielding sulfurous acid when treated with an acid having a higher ionization constant than sulfurous acid. Examples of oxidizable sulfoxy compounds are sodium sulfite, sodium bisulfite, sodium hydrosulfite, sodium thiosulfate, "Sulfoxite" C (sodium salt of formaldehyde sulfoxylic acid), dialkyl sulfites, e. g. diethyl sulfite, and the like.

The monomers used for the preparation of polymers in accordance with this invention should be essentially free of interfering impurities such as acetylene and oxygen. Preferably the molecular oxygen content of the system should be as low as it is possible to attain, although up to 1200 parts per million may be tolerated.

The pH may be within the range of 7 to 11, but it is desirable, as stated above, that a constant pH be maintained. At low polymerization temperatures, particularly at 30° C. to 75° C., this is not difficult since the rate of formation of soluble chlorides at these temperatures is so slow that a suitable buffer, such as borax, added prior to the start of the polymerization can adequately maintain the pH at about 7.5 to 9.0. At higher polymerization temperatures it is preferable to maintain the pH at lower level, namely about 7.0 to 8.5, thus decreasing the rate of formation of soluble chlorides. In the latter case, it is possible to keep the pH within the desired range by frequent addition of small portions of the buffer salt.

The buffer salt is employed in quantity to give the desired pH, and this varies with the particular salt used. Generally, however, from 0.25% to 1.0%, based on the weight of monomers, is sufficient. The reducing salt may be present in quantity up to about 1%, by weight of the monomers, although from 0.001% to 0.1% is generally sufficient.

Pressures up to 3000 atmospheres and above may be employed. The pressure employed generally exceeds 5 atmospheres and is preferably in the range from 15 to 1500 atmospheres. The pressure is maintained within the desired range by decreasing the free space within the reactor either mechanically or by injecting water, ethylene, vinyl chloride, or a mixture of ethylene and vinyl chloride.

The polymerization temperatures used in this invention are within the range 30° C. to 300° C., preferably 40° C. to 200° C.

As catalysts there may be used diacyl peroxides such as diacetyl peroxide, dibenzoyl peroxide, dilauroyl peroxide, tertiary butyl perbenzoate and acetyl benzoyl peroxide, dialkyl peroxides, such as dimethyl dioxide, diethyl dioxide, ethyl methyl dioxide, ditertiary butyl dioxide, etc., hydrogen peroxide, ammonium persulfate, potassium persulfate, etc., hydrazines, amine oxides, etc. The amount of catalyst which may be used is generally 0.0001% to 5.0%, by weight of the monomers, preferably 0.001% to 0.5%.

The polymers containing from 74% to 90% combined vinyl chloride are best prepared at pressures of 10 to 1500 atmospheres and at temperatures of 30° to 100° C., employing a suitable catalyst in an organic solvent reaction medium, such as benzene, toluene, xylene, isooctane, dioxane, tertiary butyl alcohol, and the like. These polymers, and especially those containing from 85% to 90% combined vinyl chloride, uniquely combine properties of toughness, clarity, flexibility, and solubility at normal temperatures in aromatic hydrocarbon solvents, e. g. xylene and toluene, which make them particularly useful in coating compositions and for unsupported films.

The following examples will serve further to illustrate our invention.

*Example 1.*—A stainless steel-lined shaker tube having a volume of 400 cc. is charged with 140 grams of water, 0.2 gram of benzoyl peroxide, and 1.0 gram of borax. The pH of this mixture is 8.8. The shaker tube is evacuated and is then charged with 120 grams of vinyl chloride and 80 grams of ethylene. During a reaction period of 13 hours, throughout which the temperature is maintained at 75° C. to 77° C., and the pressure within the range 850 to 985 atmospheres by periodic injection of deoxygenated water, there is a total pressure drop of 1185 atmospheres. The reactor is thereafter found to contain 68 grams of a polymer containing 42.4% chlorine, which corresponds to a vinyl chloride content of 74.8%. Pressed films of this polymer are exceptionally pliable and strong, and have a high degree of elasticity and are soluble in xylene and toluene.

*Example 2.*—Into a stainless steel-lined shaker tube having a capacity of 400 cc. is placed 100 grams of water, 0.2 gram of benzoyl peroxide, 1.0 gram of borax, and 0.1 gram of sodium formaldehyde sulfoxylate. The pH of the charge is 8.75. The shaker tube is closed, evacuated, cooled, and charged with 150 grams of vinyl chloride and 100 grams of ethylene. Heating and agitation are started. During a reaction time of 7.75 hours, throughout which the temperature is maintained at 75° C. and the pressure in the range of 750 to 960 atmospheres by periodically injecting deoxygenated water into the reactor, there is a total pressure drop of 825 atmospheres. The reactor is cooled, bled of excess gas, opened, and discharged. The reaction mixture has a pH of 9.2. From the reaction mixture there is recovered 90 grams of ethylene/vinyl chloride polymer containing 46.1% chlorine, which corresponds to a vinyl chloride content of 81.3%. The polymer is strong, and highly elastic and soluble in xylene and toluene.

*Example 3.*—A 1400 cc. stainless steel pressure reactor is flushed with oxygen-free nitrogen and charged with 2.0 grams of ammonium persulfate, 4.0 grams of borax and 400 cubic centimeters of deoxygenated water. After removal of the nitrogen by evacuation, the reactor is cooled, 300 grams of vinyl chloride monomer is distilled into the reactor and 200 grams of ethylene pressured into the reactor. The reactor is then agitated and heated to 60° C. The polymerization proceeds during a five hour period under autogenous pressure. The reactor is then cooled and the excess monomer bled-off. There is obtained a dispersion of ethylene/vinyl chloride polymer in water. This aqueous dispersion can be used for impregnating cloth, paper or for film casting purposes. Coagulation of the dispersion with a saturated solution of sodium sulfate yields 97 grams of ethylene/vinyl chloride polymer, which after washing and drying contains, according to chlorine analysis, 85.5% combined vinyl chloride. This ethylene/vinyl chloride polymer is soluble to the extent of at least 20% by weight in xylene and toluene. This property together with excellent inertness and inherent flexibility makes this polymer outstanding for use in finishes. The outstanding flexibility, toughness and excellent adhesion of the polymer to metal surfaces is shown by the fact that 1–2 mil plasticizer-free baked coatings on bonderized autobody steel cold-draw instead of shattering when the coating is indented by sharp impact. This property is also retained on prolonged aging of the finish. In addition, when titanium dioxide is dispersed with this polymer, a white enamel containing 40 to 60% solids in xylene is obtained which yields white coatings on steel or bonderized steel after baking about 30 minutes, at about 250° F., which possess excellent hardness, excellent mar resistance, excellent toughness, excellent flexibility to impact, excellent adhesion, excellent gloss and excellent inertness to grease, food and fruit stains, water, acids and alkalies. These outstanding properties combined with ready solubility in cheap aromatic hydrocarbon solvents makes this polymer well suited both property-wise and cost-wise for such industrial enamel outlets as refrigerator enamels, washing machine enamels and sink cabinet enamels.

*Example 4.*—A 1400 cc. stainless steel pressure reactor is flushed with oxygen-free nitrogen and charged with 2.0 grams of benzoyl peroxide, 10 cubic centimeters of tertiary butyl alcohol and 400 cc. of benzene. After the reactor is cooled and the nitrogen evacuated, 375 grams of vinyl chloride are distilled into the reactor and 175 grams of ethylene pressured into the reactor. The reactor is then agitated and heated to 60° C. for a five hour period under 500 lb./in.$^2$ pressure. The reactor is then cooled and the charge removed. There is obtained 24 grams of polymer which contains, according to chlorine analysis, 89.6% combined vinyl chloride. A 20% solution of this polymer in xylene possesses a solution viscosity of 2.63 poises at 25° C. By use of toluene as the reaction medium there is obtained a polymer solution from the reactor which can be directly formulated into finishes at a substantial cost savings. An ethylene/vinyl chloride polymer made as described above but containing 91% combined vinyl chloride is insoluble in xylene at room temperature even to the extent of 5% solids.

The effect of variations in vinyl chloride content on polymer properties at the same apparent molecular weight (as reflected by constant viscosity at constant concentration in dilute solution in any particular solvent, e. g. viscosity=0.22 poise at 25° C. as 10% solution in cyclohexanone), is shown in the table below:

| Per Cent Vinyl Chloride in Polymer | Viscosity, poises 20% solids by weight in Xylene at 25° C. | Physical Properties |
| --- | --- | --- |
| 91 | Insoluble | T/E=5600/6, Mod.=0.165×10⁶ p. s. i. |
| 89 | 1.00 | T/E=5200/9, Mod.=0.168×10⁶ p. s. i. |
| 85 | 0.50 | T/E=4360/8, Mod.=0.120×10⁶ p. s. i. |
| 79 | 0.22 | Somewhat rubbery solid. |
| 76 | 0.14 | Rubbery solid. |
| 70 | 0.06 | Tacky semi-solid. |

T/E=Tensile strength in lb./in.² and elongation at break.
Mod.=Young's bending modulus.

From the above table it is clear that an increase of 2% in the vinyl chloride content of the polymer renders it insoluble in aromatic hydrocarbon solvents. The difference, brought about by a small change in composition, is unexpected. As the vinyl chloride content is reduced the polymer becomes more rubbery in nature and between 76% and 70% there is a sharp change to a tacky semi-solid, which is unlike polyvinyl chloride and polyethylene. The ethylene/vinyl chloride polymers containing from 74% to 90% vinyl chloride and especially those containing from 85% to 90% vinyl chloride are tough solids from which tough films possessing a high degree of flexibility and adherence to metallic surfaces can be obtained. They are soluble in aromatic hydrocarbons, e. g., xylene, to the extent of at least 20% at 25° C. This property, along with flexibility, toughness, adherence to metallic surfaces, high gloss and outstanding inertness to corrosive agents makes these polymers highly useful in finishing compositions especially for white industrial enamels or protective coatings for vats, tanks, food cans, beer cans, electroplating bath racks, safety glass interlayers, etc.

If desired a minor amount of a third polymerizable component can be included with the ethylene and vinyl chloride. In certain cases it is desirable to have a minor quantity of maleic anhydride or similar unsaturated acid in the polymerization mixture in the production of modified ethylene/vinyl chloride polymers in order to improve adhesion to such surfaces as metals, glass, wood, etc.

To the ethylene/vinyl chloride polymers of this invention may be added pigments, fillers, dyestuffs, plasticizers, curing agents, stabilizers, resins, waxes and the like materials commonly used to formulate protective and decorative coatings.

The equipment in which ethylene/vinyl chloride polymers are prepared in accordance with this invention consists essentially of a pressure-resisting vessel made of or lined with stainless steel, silver, lead, glass, enamel, or other substances which do not have an adverse effect on the polymerization reaction. High tensile chrome-vanadium steel, or other mild steel, may be employed, particularly if the reactor is pre-treated, i. e., thoroughly cleaned of inhibitors by contacting with hydrogen peroxide, by polishing, or by continued use in polymerization systems. The process may be conducted either batchwise or continuously. Agitation is generally provided by shaking or stirring devices, or by inducing turbulent flow in continuous systems.

We claim:
1. A solid ethylene/vinyl chloride polymer containing 74% to 90% by weight of combined vinyl chloride, copolymerized with correspondingly from 26% to 10% by weight of combined ethylene, said polymer being soluble in an aromatic hydrocarbon solvent to the extent of at least 20% by weight.

2. A solid ethylene/vinyl chloride polymer containing 85% to 90% by weight of combined vinyl chloride, copolymerized with correspondingly from 15% to 10% by weight of combined ethylene, said polymer being soluble in xylene at 25° C. to the extent of at least 20% by weight.

MERLIN M. BRUBAKER.
JOHN R. ROLAND.
MERLIN D. PETERSON.

REFERENCES CITED

The following references are of record in the file of this patent:

UNITED STATES PATENTS

| Number | Name | Date |
| --- | --- | --- |
| 2,200,421 | Perrin | May 14, 1940 |